INVENTORS
RAYMOND BIRD
BRIAN TAYLOR
BY [signature]
ATTORNEY

DATA STORAGE DEVICES

Filed Aug. 20, 1956 2 Sheets-Sheet 2

INVENTORS
RAYMOND BIRD
BRIAN TAYLOR
BY [signature]
ATTORNEY

United States Patent Office 2,890,439

Patented June 9, 1959

2,890,439

DATA STORAGE DEVICES

Raymond Bird, Letchworth, and Brian Taylor, Wiltshire, England, assignors to The British Tabulating Machine Company Limited, London, England, a British company Application August 20, 1956, Serial No. 604,992

6 Claims. (Cl. 340—173)

This invention relates to data storage apparatus. One object of the invention is to provide a simple binary storage device using gas-filled valves or diodes with quick access to the stored data.

Another object is to provide improved stability and control over read in and read out of data by such storage devices by the use of one amplifier in common for both purposes.

According to the invention, data storage apparatus has a gas-filled valve or diode, a source of voltage connected to a first electrode through a load impedance, three input connections to the second electrode, the first of these input connections being connected to two lock lines via a resistor and two unidirectional conducting devices connected in opposite sense, said lock lines having voltages adapted to hold said second electrode at a voltage relative to the first electrode of a value sufficient to maintain the gas valve or diode in its conducting state, if fired, and in its non-conducting state, if extinguished, means to alter the said lock voltages in opposite senses to unlock the said second electrode so as to free said second electrode to alter in potential under control of a potential applied to said second connection to cause said valve to fire or extinguish, and means to apply to said third connection a pulse short in relation to the de-ionisation time of the said gas valve so that an impulse may be produced across the load impedance if the valve is conducting without terminating said conduction.

A plurality of such storage elements forming a row may be connected in parallel to one read/record amplifier, one storage element being selected for reading out or read in by the application of the read out pulses or the release of the lock pulses respectively. A plurality of such rows may be employed with one element of each row forming a column and the column selected for application of read out pulses or release of lock pulses. The amplifiers may be connected to trigger circuits and the latter may be interconnected to form a shifting register. By trigger circuit is meant devices such as cross-coupled valves, transistors and the like connected to have two stable states and adapted to be switched from one state to the other by pulsing and to provide a D.C. potential representative of each state.

Figure 1:
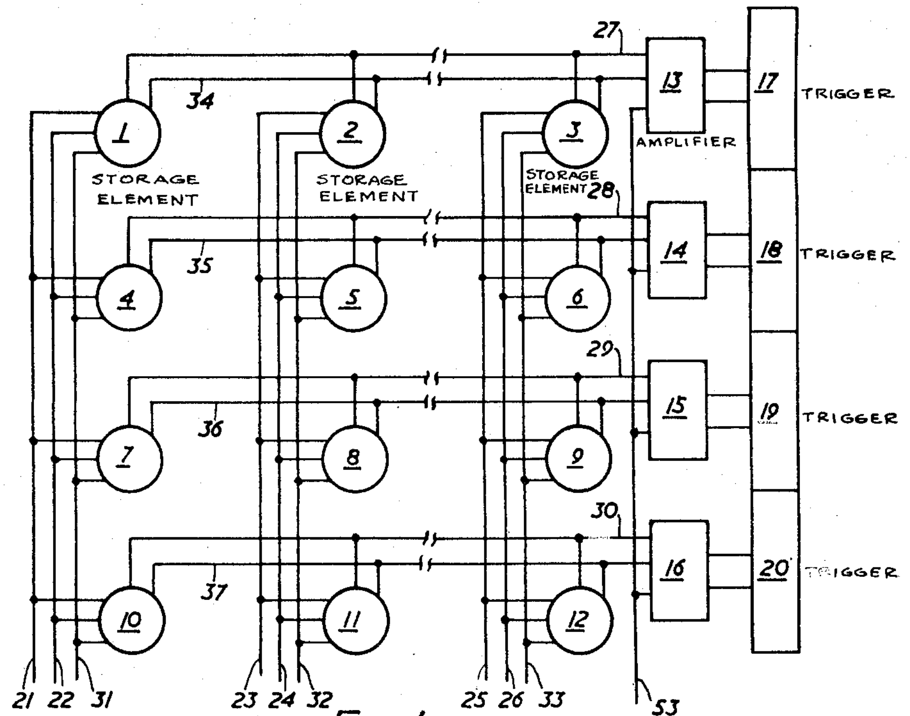
Figure 4:
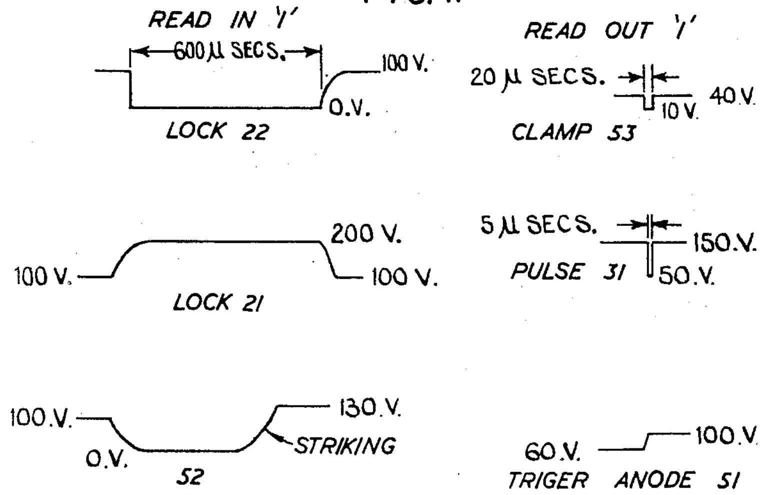
Figure 2:
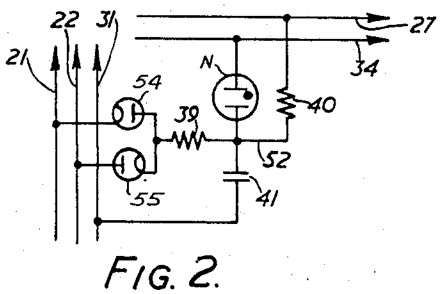
Figure 3:
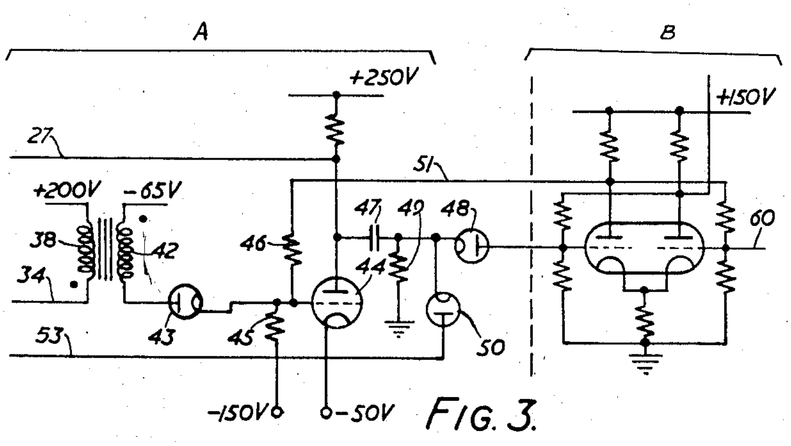
Figure 5:
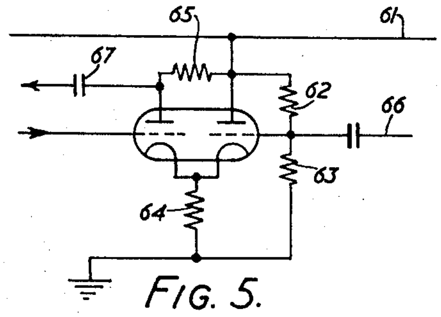

The invention will now be described, by way of example, with reference to the accompanying drawings, in which:

Figure 1 shows in block form storage elements connected as a matrix to read/record amplifiers and triggers, Figure 2 shows the storage element represented by block 1 of Figure 1, Figure 3 shows the read/record amplifier represented by each of blocks 13 to 16 of Figure 1 and the trigger circuit represented by blocks 17 to 20 of Figure 1, Figure 4 shows waveforms at points in Figures 2 and 3 with representative voltages and times, Figure 5 shows a pulse gating circuit.

The block diagram of Figure 1 shows a matrix of storage elements suitable for storing three words of four binary elements each. Storage elements 1, 4, 7, 10 represent storage for one word, 2, 5, 8, 11 for a second word, and 3, 6, 9, 12 for a third word. It will be readily apparent from the broken lines how further columns may be added to increase the word capacity or the column length increased to increase the code elements in a word.

Data are entered on the triggers 17, 18, 19 and 20 and under control of read in amplifiers 13, 14, 15, 16 entered onto one of the three columns as selected by unlocking voltages applied in pairs to all the elements of the selected column, i.e., wires 21 and 22, or 23 and 24, or 25 and 26. The voltage delivered by each of the amplifiers under control of its associated trigger is connected to the rows, i.e., the amplifier 13 to the 1, 2, 3 storages by wire 27, the amplifier 14 to the 4, 5, 6 storages by wire 28, the amplifier 15 to the 7, 8, 9 storages by wire 29, the amplifier 16 to the 10, 11, 12 storages by wire 30.

The read out of a word is obtained by pulsing one of the three lines 31, 32, 33 and also line 53. Then each storage element receiving a pulse and which is also conducting delivers a pulse to its associated amplifier in the row along lines 34, 35, 36, 37 to operate the amplifiers which in turn set their associated triggers 17, 18, 19, 20 accordingly. The Figure 2 shows in detail a storage element corresponding to the block 1 of Figure 1. The blocks 1 to 12 are identical in structure.

Each storage element is formed by a gas discharge valve which is preferably a two electrode Neon-filled valve. The anode of the gas filled valve is connected via line 34 to positive line, e.g., 200 volts, via a pulse transformer primary 38 which is shown in Figure 3 and which forms part of block 13 in Figure 1. The cathode is connected via a resistor 39 to two diodes connected in opposite senses. Thus the effect of this pair of diodes is to the cathode at the potential of lines 21 and 22, both normally at about 100 volts. The voltages applied to the lines 21 and 22 are varied in a manner to be described for selection of the storage element when entering data. The cathode of the gas valve N is also connected via a high resistance resistor 40 to line 27, to which the amplifier of block 13 (Figure 2) applies the recording voltage.

A third connection to the cathode of the gas valve is via a capacitor 41 to the read out pulse line 31. With the gas valve non-conducting and lines 21 and 22 at approximately 100 volts, there is insufficient voltage to cause the gas valve to strike. If the gas valve is conducting, then some 70 volts will be developed across the valve and 30 volts across the resistor 39, and the valve will continue to conduct and will be unaffected by the small current through the resistor 40. Assuming the conductive condition represents a value and non-conduction represents "0," then if a short negative read out pulse is applied to line 31 the pulse developed across the transformer 38 will be large when the impedance of the gas valve is low, i.e., the valve is struck, and very small when the impedance of the gas valve N is high, i.e., the valve is extinguished. This read out pulse must be of short duration (Figure 4, waveform 31) such a 5 micro-seconds. This pulse must be short in relation to the de-ionization time of the gas valve N because (*a*) if the valve being read out is non-conducting the pulse must not be of sufficient duration to result in striking of the valve to which it is applied, and (*b*) any other conducting or non-conducting valves N operated in common from the transformer winding 38 must not be altered in state.

To effect recording, a read-in setting voltage, long in relation to the ionization time, e.g., 600 micro-seconds, is applied to line 27 by the read/record amplifier 13 and for this period the voltages on lines 21 and 22 are altered to "200" and "0" respectively, thus ensuring that neither of the vacuum diodes 54 and 55 may conduct and leaving the cathode of the gas valve free to float to either level under control of the voltage applied to line 27. Suitable waveforms are shown in Figure 4, numbered in accordance with the lines to which they are applied; waveforms 21 and 22 show the lock/unlock voltages. The voltage change resulting at the gas valve cathode line 52 is shown in waveform 52 for a potential on line 27 low enough, e.g., zero volts, to strike the gas valve. Correspondingly, with line 27 high a struck Neon would extinguish.

The line 27 is connected to the anode of a valve 44 in the amplifier (Figure 3). The potential on the line 27 is therefore controlled by the state of this valve. For example, if a "1" is to be read-in, the trigger shown in section "B" of Figure 3 is set so that the right-hand half of the trigger valve is conducting and line 51 is therefore at high potential. Since the line 51 is connected through a resistor 46 to the grid of the valve 44, this valve is therefore in a conductive state and the line 27 is at low potential.

Section "A" of Figure 3 shows a read/record amplifier as shown in block 13 of Figure 1. Blocks 14, 15, 16 are each similar to block 13. Section "B" of Figure 3 shows a trigger as shown in block 17 (Figure 1) of the well-known cathode coupled flip-flop type. Blocks 18, 19, 20 are similar to block 17. Before reading out, the triggers are each set by pulsing the right grid 60 negatively to represent "0," i.e., left valve conducting, and therefore line 51 in its lower voltage state, as no signal is read out from the gas-filled valves when non-conducting. "0" is therefore with this convention also represented by no input pulse from the pulse transformer to the trigger. A value read out pulse on pulse transformer 42 results in a negative pulse being delivered by the read/record amplifier to the trigger to set it to the "1" state.

A negative read out pulse on the primary 38 of the pulse transformer results in a positive pulse on the secondary 42. This pulse is delivered to the grid of the read/record amplifier triode 44 via an isolating diode 43. The grid of this amplifier with the trigger set in its "0" condition is held non-conducting by the potentiometer formed by resistor 45 connected to −150 volts and resistor 46 which is connected to the anode of the left-hand triode of the trigger set at "0," which is therefore in its lower voltage state.

The positive pulse delivered to the grid causes valve 44 to conduct and deliver a corresponding negative pulse via capacitor 47 and diode 48 to the left grid of the trigger causing this left valve to stop conducting. Between capacitor 47 and diode 48 are connected a diode 50 and a resistor 49 connected at its other end to earth. The anode of diode 50 is connected to a clamping voltage applied over line 53. Except when a read out pulse is to be applied this line is held at a higher positive potential than the left grid of the trigger connected to the anode of the diode 48, thus preventing any negative pulse being delivered to the trigger. Waveforms 54 of Figure 4 show how the clamping voltage is reduced for the period of read out so as to allow negative pulses to reach the trigger as above described. The trigger circuit may be any of the numerous circuits in which two stable states are provided and in which (*a*) the circuit may be switched by a short pulse from one state to the other, and (*b*) a voltage can be provided representative of the state of the circuit.

The triggers may be arranged for read in or read out of data in either parallel form or in serial form.

In the parallel case each left hand grid is negatively pulsed through a pulse gate for entry of a "1" and each right hand grid for entry of a "0." Read out may be effected either by re-setting all triggers to "0" and taking the pulses from the left hand anodes or by use of a pulse gate conditioned by each left hand anode. In the serial case, entry is effected on a first trigger and the pattern shifted in by transferring the setting of the previous trigger onto the adjacent trigger. Read out is then effected by repeated shifting taking the pulses from the last trigger.

A method of transferring the setting of one trigger to another is to connect a negatively pulsed gate between each anode of a first trigger and the corresponding grid of the adjacent trigger to be switched. Figure 5 shows a suitable pulse gate for use in either the serial or parallel case. This consists of a double triode, the right hand grid being connected to a potentiometer between the positive line 61 and earth formed by resistors 62 and 63 to normally maintain the grid at 110 volts. The right hand anode is connected to the positive line and the common cathode by resistor 64 to earth so that the cathode is held at little more than 110 volts positive. The left hand grid is connected to an anode of the preceding trigger.

The left hand anode is connected to positive line 61 via resistor 65 and is capacitively coupled to the like grid of the adjacent trigger which is to receive the setting of the preceding trigger. The right hand grid is also capacitatively coupled to the shift pulse line 66. The left hand anode of a preceding trigger is connected to a left hand grid of a succeeding trigger by such a pulse gate and likewise the right hand anode of a preceding trigger to the right hand grid of an adjacent trigger. Thus the left hand grid of the gate never rises above 100 volts so that normally the left hand half of the gate is non-conducting. Upon application of a negative pulse to the shift pulse line 66 of approximately 30 volts, the right hand grid and cathode will tend to drop to 80 volts. If the anode of the preceding trigger is at 100 volts the cathode will be maintained at nearly this value by the flow of current through resistor 65 and the left half of the gate, and the drop in voltage across resistor 65 will develop a negative pulse on the grid of the succeeding trigger connected to capacitor 67.

If the anode of the preceding trigger is at less than 75 volts, then the left half of the gate will still be non-conducting with the cathode at 80 volts, and no output pulse will be generated.

A trigger circuit similar to the one shown in Figure 3 may be employed to generate the two lock/unlock pulse waveforms by utilising D.C. connections to each anode.

Summarising the operation, it is seen that for read in a gas-filled valve having waveforms applied to lines 21 and 22, as shown in Figure 4, is unlocked and fires or extinguishes as determined by the voltage on line 27, which is itself determined by the amplifier, which in turn is under control of line 51 from the trigger. For reading out, a gas filled valve which is struck, i.e. is set, in the "1" condition, delivers a pulse to the same amplifier as was used for read in to it upon receipt of a pulse on line 31 and this amplifier passes a corresponding pulse to set the associated trigger, provided the clamp voltage on line 53 is also lowered to permit its delivery to the trigger.

Data entered on the triggers either in parallel or serial form is stored in parallel form and may be read out in parallel form or in serial form. In parallel form entry of data into store takes time of the order of 600 microseconds, but read out less than one-hundredth of this time.

What we claim is:

1. Data storage apparatus comprising a matrix of storage devices, said matrix having several rows and several columns, each of said storage devices including a gas-filled diode having a first and a second electrode, a first, a second and a third input connection to said second electrode, a resistor included in said first input connection, and two oppositely connected unidirectional conducting devices connected to said resistor, for each row of said matrix, a common load impedance and a source of voltage connected through said load impedance to the first electrodes of all of said gas-filled diodes of the row; for each column of said matrix, a first lock line connected in common to one of said unidirectional conducting devices of each of the storage devices of the respective column, a second lock line connected in common to the other of said unidirectional conducting devices of each of the storage devices of said column, means for applying to said lock lines locking voltages to maintain the existing conduction condition of the gas-filled diodes of the respective column and unlocking voltages permitting the potential of the second electrodes of the gas-filled diodes of the respective column to alter under control of a potential applied to the said second input connections of the gas-filled diodes of the respective column, and means for applying in common to the said third input connections of all said storage devices of the respective column a pulse short in relation to the deionization time of the gas of said gas-filled diodes to produce an impulse across the load impedance of any conducting gas-filled diode of the respective column while maintaining said conduction; and for each row of said matrix means for applying data signals to the second input connections of all the gas-filled diodes of the respective row, to control the conduction of the gas-filled diode of the respective row unlocked by said unlocking voltages on said lock lines.

2. A data storage device as claimed in claim 1 comprising also for each said row a read/record amplifier connected to receive impulses delivered from the load impedance of the row, said amplifier being also connected to the second connections of the gas-filled diodes of the row to provide a voltage in accordance with the state of conduction of the gas-filled diode to the third connections of which the pulse is applied.

3. A data storage device as claimed in claim 2, in which the amplifier is adapted to switch a trigger circuit on receipt of an impulse and in which the trigger circuit is adapted when in one state to control the amplifier to provide a voltage of sufficient duration and amplitude to effect striking of the gas-filled diode if an unlocking voltage has also been applied to said first connection.

4. A data storage device as claimed in claim 3, in which the trigger circuit is adapted when in said other state to control the amplifier to provide a voltage of sufficient duration and amplitude to effect extinguishment of any struck gas-filled diode if an unlocking voltage has also been applied to said first connection.

5. A data storage device as claimed in claim 3, in which the load impedance of said gas-filled diode comprises a pulse inverting transformer.

6. A data storage device as claimed in claim 5, having voltage clamping means between the said amplifier and the said trigger so as to prevent pulses passing from the amplifier to the trigger, said clamping means being rendered ineffective during said short read out pulse.

References Cited in the file of this patent

UNITED STATES PATENTS

| | | |
|---|---|---|
| 2,594,389 | Bruce | Apr. 29, 1952 |
| 2,709,042 | Couffignal | May 24, 1955 |

UNITED STATES PATENT OFFICE

CERTIFICATE OF CORRECTION

Patent No. 2,890,439 June 9, 1959

Raymond Bird et al

It is hereby certified that error appears in the above numbered patent requiring correction and that the said Letters Patent should read as corrected below.

In the heading to the printed specification, between lines 7 and 8, insert:

Claims priority, application Great Britain
August 30, 1955

Signed and sealed this 12th day of April 1960.

(SEAL)
Attest:

KARL H. AXLINE
Attesting Officer

ROBERT C. WATSON
Commissioner of Patents